INVENTOR.
FRANK KESSLER
BY
Winfred T. Powell
ATTORNEY

Oct. 13, 1953 F. KESSLER 2,655,558

TELEPHONE PAY STATION ADAPTER COMMON TO A PLURALITY OF LINES

Filed June 17, 1949 3 Sheets-Sheet 2

ADAPTER

INVENTOR.
FRANK KESSLER
BY
Winfred T. Powell
ATTORNEY

INVENTOR.
FRANK KESSLER
BY
Winfred T. Powell
ATTORNEY

Patented Oct. 13, 1953

2,655,558

UNITED STATES PATENT OFFICE 2,655,558

TELEPHONE PAY STATION ADAPTER COMMON TO A PLURALITY OF LINES

Frank Kessler, Rochester, N. Y., assignor to Stromberg-Carlson Company, a corporation of New York Application June 17, 1949, Serial No. 99,738

9 Claims. (Cl. 179—6.3)

This invention relates to measured service telephone systems and more particularly to means for automatically controlling the collection and refunding of coins deposited in paystation apparatus at the subscriber's station.

The main object of the present invention is the provision of new and improved circuit arrangements whereby the paystation apparatus at the central office is reduced to a minimum.

A specific object of the present invention is the arrangement of the central office circuits in a new and improved manner by means which permits regular (non-paystation) and paystation lines to be operated in the same group, with discriminating means provided in each primary or finder-selector link for controlling the automatic application of coin control potential to a calling paystation line and the omission of the application of this coin control potential when the same link is used by a calling regular line.

More specifically, an adapter circuit is connected between the line finder and selector (or line finder and connector in smaller systems) of the link, which permits calls from regular lines to be handled by the link in the usual manner while calls from paystation lines are handled by the link in a different manner, i. e., locking a calling paystation line to the link and applying coin control or coin return potential to the calling line as determined by whether or not the call was answered by the called party.

Other features of the invention not specifically mentioned will be apparent from the following description.

Figure 1:
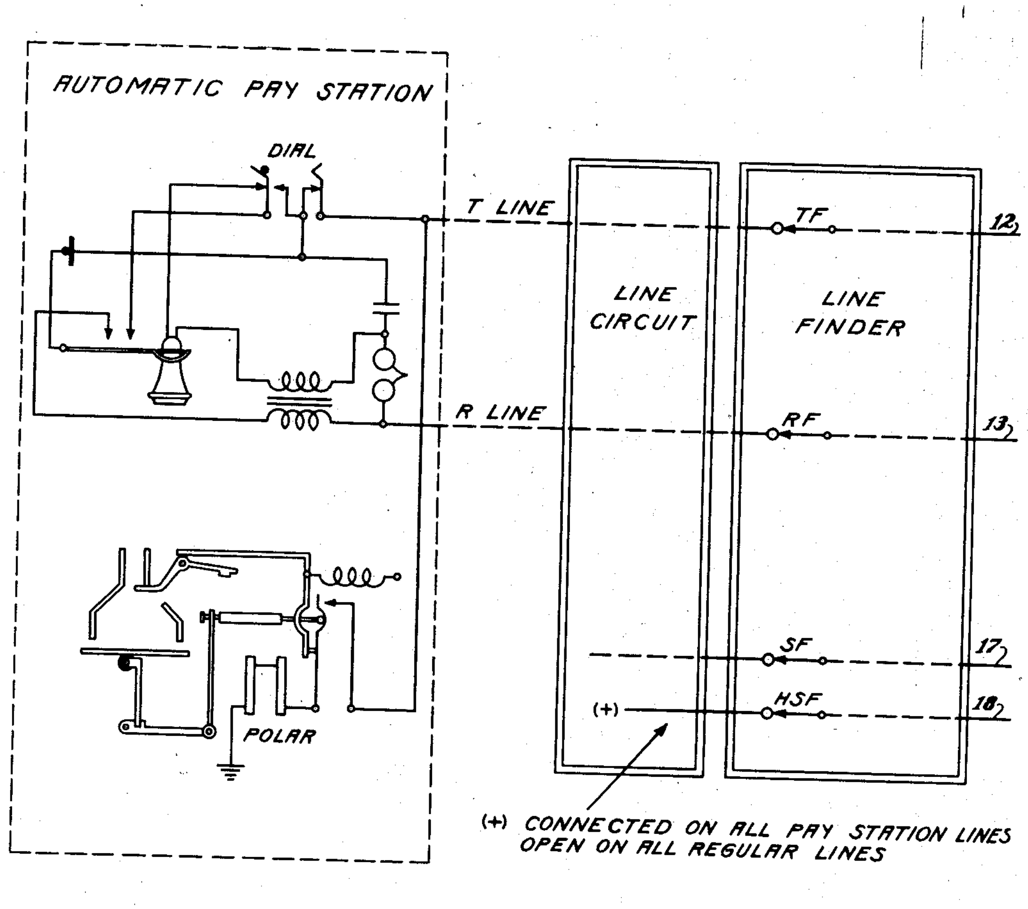
Figure 2:
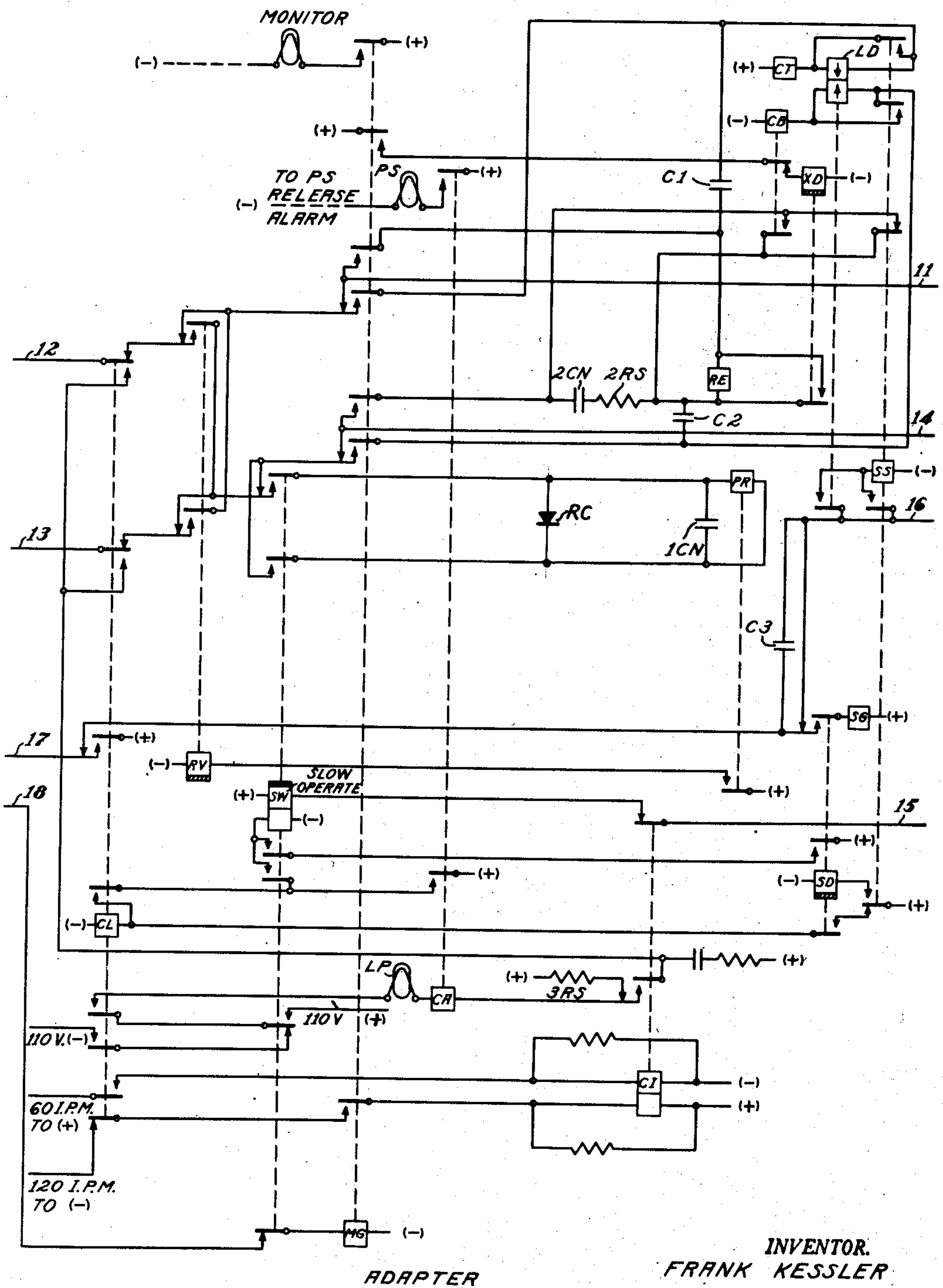
Figure 3:
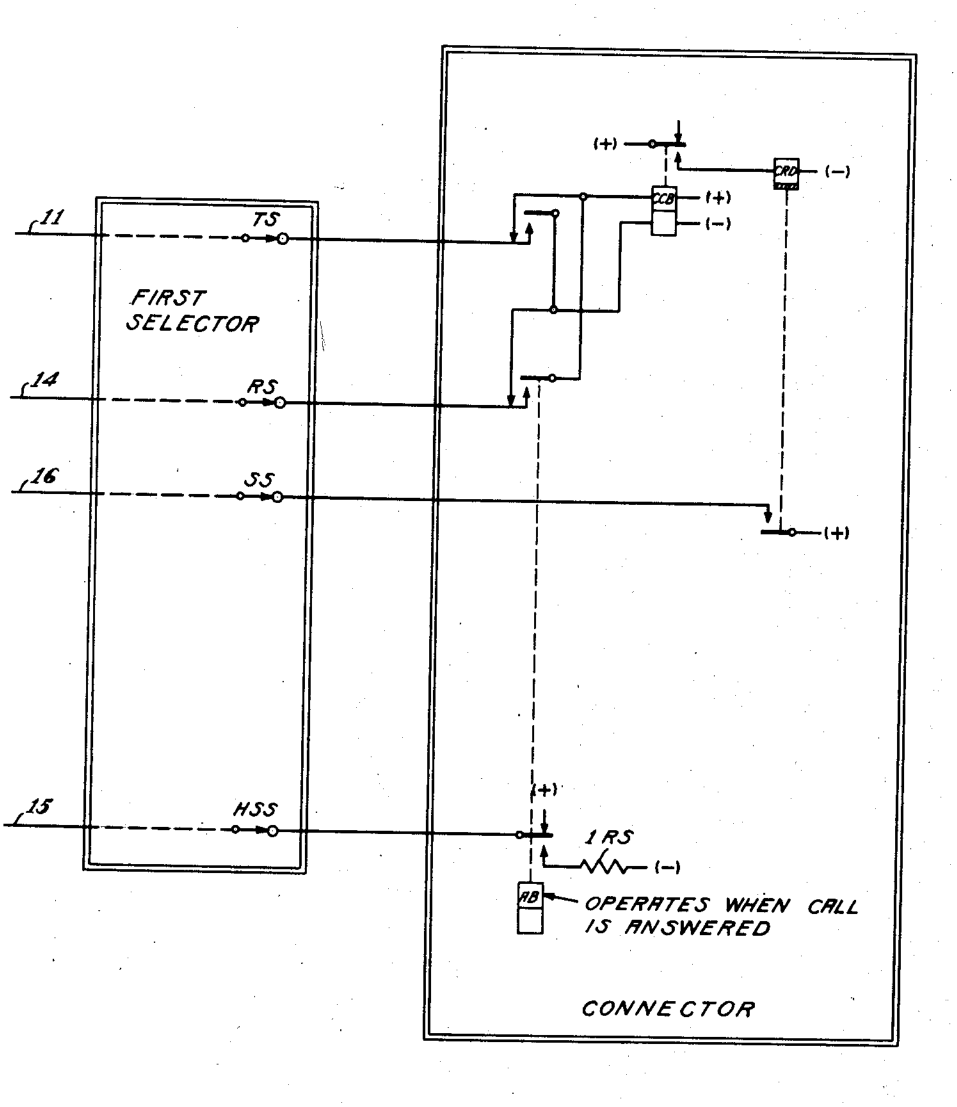

Referring to the drawings, comprising Figs. 1, 2 and 3, the paystation adapter circuit is shown in detail, while other components of a telephone system are shown in block diagram. These drawings should be placed in the order named above with correspondingly identified lines in alignment.

The automatic paystation at the substation illustrated in the left hand portion of Fig. 1 may be of the well known type of coin mechanism shown in Forsberg Patent 1,043,219, issued November 5, 1912.

The present invention is in the nature of an improvement on the measured service telephone system shown and described in Pharis application Serial No. 80,993, filed March 11, 1949, and assigned to the same assignee as the invention described in the patent application. In the Pharis application, a paystation adapter is associated with each paystation line and arranged to operate with finder-selector (or finder-connector)

links, these links also functioning to handle calls from regular or non-paystation lines, the coin control functions being effected in the paystation adapter associated with the paystation line. The present invention provides the same service for collecting and refunding calls on originating connections from paystation lines, while cancelling these collecting and refunding operations on calls from regular lines, in a more economical manner by reducing the number of adapters required, since they are located in the link circuits common to both paystation and regular lines.

For the purpose of simplifying the illustrations and facilitating the explanation, various parts and circuits constituting the embodiment of the present invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in a conventional manner and symbols are used to indicate the connections to the terminals of batteries or other sources of current instead of showing all the wiring connections to these terminals. (+) and (−) symbols are employed to indicate the positive and negative terminals respectively of the usual common battery, or other source of direct current, instead of using the ground and battery symbols usually found in telephone circuits, it being understood that the (+) terminal is connected to ground. The coin control direct current source is indicated 110V (+) and 110V (−) to identify the positive and negative terminals of the high voltage coin return battery or other source of direct current. The contacts of the various relays are located at various distances from the block representing the winding of the relay with these contacts being indicated associated with the relay by means of a dashed line.

In order to explain the operation of the circuits it will be pointed out how two types of calls are set up through the system, first a call from a regular line and second a call from a paystation line.

*Call from regular line*

When the receiver is removed from the hookswitch at the calling station the closed circuit across the T and R line conductors operate through line and line finder circuits (not shown) in the well known manner for extending a connection from the calling line, by way of the line finder to the finder-selector link including the paystation adapter. As above mentioned, regular and paystation lines are located in the same group to which the finder has access. Consequently, when the connection is extended to the finder-selector link and dial tone is received the calling subscriber dials the first digit for operating the first selector (not shown) for selecting a connector (not shown in detail), all in the usual manner.

When the connector is selected the closed circuit across the calling line operates relay CCB of the connector over a circuit which may be traced from (+), upper winding of relay CCB, break contact of relay AB, terminal and wiper TS of the first selector, conductor 11, break contact of relay MG, break contact of relay RV, break contact of relay CL, conductor 12, tip wiper TF and terminal of the line finder, over the tip side of the calling line, through the calling substation, over the ring side of the calling line, terminal and wiper RF of the line finder, conductor 13, break contact of relay CL, break contact of relay RV, break contact of relay SW, break contact of relay MG, conductor 14, wiper RS and terminal of relay AB and first selector, break contact of relay AB and lower winding of relay CCB to (—). Relay CCB closes an obvious operating circuit for relay CRD which applies (+) potential back over the terminal and wiper SS of the first selector for making this connector busy and for holding purposes, all in the well known manner, it being understood that sleeve wiper SF and terminal of the line finder are first connected to (+) when the line finder associates the finder-selector link with the calling line.

The call goes through to the called station in the usual manner and when the call is answered, relay AB is operated over the called line circuit (this being the battery feed relay to the called line) for switching the circuit leading to the upper winding of relay SW from (+) to (—). This effects the operation of relay SW over a supervisory circuit which may be traced from (+), upper winding of relay SW, break contact of relay CI, conductor 15, wiper and terminal HSS of the first selector, make contact of relay AB and resistor 1RS to (—).

The operation of relay SW opens up the winding of relay MG for preventing any false operation of this relay on a call of this class. The operation of relay SW also inserts the winding of relay PR in the calling line circuit, the circuit now being traced from (+), upper winding of relay CCB, break contact of relay AB, terminal and wiper TS, conductor 11, break contact of relay MG, break contact of relay RV, break contact of relay CL, conductor 12, wiper TF and terminal of the line finder, tip side of the calling line, substation circuit, ring side of the calling line, terminal and wiper RF of the line finder, conductor 13, break contact of relay CL, break contact of relay RV, make contact of relay SW, winding of relay PR (shunted by condenser 1CN and rectifier RC), make contact of relay SW, break contact of relay MG, conductor 14, wiper RS and terminal, break contact of relay AB and lower winding of relay CCB to (—). Since the current flow over this circuit is in the wrong direction to permit current to flow through rectifier RC, this rectifier is ineffective to short circuit the winding of relay PR, with the result that this relay is operated. Relay PR closes an obvious circuit for operating relay RV and this relay in turn reverses the above described connection to the calling line for causing a reverse flow of current over this line for supervisory or metering purposes. The condenser 1CN connected across the winding of relay PR provides a low impedance transmission path for talking currents.

When the called party hangs up at the termination of the conversation, the above-described circuit through the windings of relay CCB is reversed at normal contacts of relay AB so that current now flows in the proper direction for rectifier RC to be conducting, which short circuits and releases relay PR for releasing relay RV, which in turn reverses the battery connection to the calling line. When the calling party hangs up, relays CCB and CRD are released for disconnecting (+) potential from terminal and wiper SS of the first selector and wiper SF and terminal of the line finder for releasing the connection and for rendering the circuits used nonbusy.

It will be seen that relay MG was not operated on the above call, since this call was from a regular line and there was no (+) potential found on the terminal of line finder wiper HSF for operating this relay.

*Call from paystation line*

On a call from a paystation line the line and line finder circuits are effective as above for extending the finder-selector link to the calling line, after which the first selector is operated from the calling dial to select an idle connector in the desired connector group, following which the connector is operated to connect with the called line, all in the well known manner, with the exception that a coin must be deposited at the calling station before the dialing operations can be effected. This exception to the previously described circuit operations will now be explained.

When the finder-selector link seizes the calling line, the closed circuit of this line is effective momentarily to operate relay CCB of the connector in the previously described manner, after which relay MG is operated for maintaining the circuit closed to the CCB relay of the connector from the adapter circuit instead of by way of the calling line. Since (+) is connected to HSF bank terminals in the finder switch corresponding to paystation lines, relay MG is operated over a circuit which may be traced from (+) on the terminal to which line finder wiper HSF is connected, conductor 18, break contact of relay SW and winding of relay MG to (—). The operation of relay MG now closes a substitute circuit to the connector which is independent of the calling line, this circuit being traced from (+), upper winding of relay CCB, break contact of relay AB, terminal and wiper TS, conductor 11, make contact of relay MG, winding of impedance coil RE, break contact of relay SS, make contact of relay MG, conductor 14, wiper RS and terminal, break contact of relay AB and lower winding of relay CCB to (—).

At this time relay CB of the adapter circuit is operated from the calling substation over a circuit which may be traced from (+), winding of impedance coil CT, upper winding of relay LD, make contact of relay MG, break contact of relay RV, break contact of relay CL, conductor 12, wiper and terminal TF of the line finder, tip side of the calling line, substation circuit, ring side of the calling line, terminal and wiper RF of the line finder, conductor 13, break contact of relay CL, break contact of relay RV, break contact of relay SW, make contact of relay MG, lower winding of relay LD and winding of relay CB to (—). Current over this circuit flows through both windings of relay LD, but since this relay is differentially connected, it does not operate its contacts at this time. The calling line talking circuit is extended to the connector by way of talking condensers C1 and C2 over the previously described trunk line conductors.

When the coin is deposited at the calling station, the coin mechanism is operated and since this mechanism is well understood its operation need not be explained in detail. The deposited coin descends past the trigger mechanism which is released by the coin with the result that the polar magnet of the coin mechanism is connected to the tip line conductor. The coin is held in suspense by a trap where it is adapted to be either collected or refunded under the control of the polar magnet. The coin may be either deposited before or after the receiver is removed but in either case relay LD in the adapter circuit is operated when both of these acts have taken place (coin deposited and line selected) because the (+) or ground applied to the tip line through the winding of the polar magnet at the substation upsets the balance of differential relay LD for effecting the operation of this relay. The operation of relay LD closes a circuit for operating relay SS which may be traced from (+) on the sleeve conductor 16 coming back from the connector, make contact of relay LD and winding of relay SS to (—). Relay SS closes a locking circuit for itself including its own make contact which is in multiple with the make contact of relay LD. A circuit is now closed for operating relay SD extending from (+), make contact of relay SS and winding of relay SD to (—). The operation of relay SS also short circuits both windings of relay LD for effecting the release of this relay.

It will be noted that relay SS has a break contact in multiple with the make contact on relay CB which is in the impulsing circuit to the switches ahead. Since relay SS is not operated until a coin is deposited, this short circuit across the impulse contacts of relay CB prevents impulsing the switch ahead if a coin is not deposited.

When relay SD is operated, the (+) coming back on the sleeve conductor 16 from the selector (or connector) is replaced by (+) through the winding of impedance coil SG for extension back to the sleeve circuits at the originating end for holding purposes. These two sleeve conductors are consequently conductively separated and inductively connected by condenser C3, thus providing means for transferring coin box tone, when required, from the calling line circuit ahead to an operator's trunk circuit which may be selected by the first selector or a switching through connector in the well known manner. Relay MG closes an obvious circuit for lighting the monitor lamp as an indication to the attendant in the local dial office that this particular adapter circuit is being used by a paystation line.

The operation of relay MG closes a circuit for intermittently operating relay CI from the common impulse circuit, this circuit being traced from (+), lower winding of relay CI, make contact of relay MG, break contact of relay CL and common conductor to which (—) impulses at the rate of 120 I. P. M. are applied. This intermittent operation of relay CI is for a purpose that will be explained later.

When the first digit is dialed, the opening of the line circuit at the calling substation is effective to impulse relay CB of the adapter, since this relay is included in the calling line circuit. The first release of relay CB closes a circuit for operating slow-to-release relay XD which may be traced from (+), make contact of relay MG, break contact of relay CB and winding of relay XD to (—). This keeps relay XD operated until the termination of the series of impulses of this digit, after which the continued operation of relay CB opens up the winding of relay XD for a sufficiently long period of time to permit this latter relay to release. The operation of relay XD short circuits the winding of impedence coil RE to remove this impedence from the impulse circuit to the switches ahead. This impulse circuit now includes the make contact of relay CB, since relay SS has been operated to remove the shunt from this make contact. The make contact of relay CB is shunted by condenser 2CN and resistor 2RS for spark absorbing purposes. It will be understood that this impulse repeating operation by the make contact of relay CB is effective to step the selector and connector in response to the digits dialed, it being understood that the impulses are repeated to the connector instead of the selector after this switch makes its selection in response to the first digit. These repeated impulses are picked up by relay CCB of the connector for operating this switch in the well known manner.

When the call is answered, relay AB of the connector operates for operating relay SW over the supervisory circuit in the previously described manner, the circuit to relay SW in this example being held open while relay CI is operated from the 120 I. P. M. pulses. Consequently relay SW operates when the previously described circuit is closed and when relay CI is released between these 120 I. P. M. pulses. Relay SW is locked operated this time over a circuit extending from (+), make contact of relay SD, make contact and lower winding of relay SW to (—). The operation of relay SW opens up and releases relay MG for in turn extinguishing the monitor lamp. The release of relay MG stops the intermittent operation of relay CI by opening up the above described circuit including its lower winding.

With relay SW operated and relay MG released, the line circuit is connected to the battery feed coil in the connector, this circuit now being traced from (+), upper winding of relay CCB of the connector, make contact of relay AB, selector terminal and wiper RS, conductor 14, break contact of relay MG, make contact of relay SW, winding of relay PR (rectifier RC being non-conducting in this direction), make contact of relay SW, break contact of relay RV, break contact of relay CL, conductor 13, wiper and terminal RF, calling line and substation circuits in series, terminal and wiper TF, conductor 12, break contact of relay CL, break contact of relay RV, break contact of relay MG, conductor 11, selector wiper and terminal TS, make contact of relay AB and lower winding of relay CCB to (—). This switching of the calling line from the CT and CB windings of the adapter to the CCB windings of the connector opens up and releases relay CB and, since relay MG is released at this time, the circuit to relay XD is incomplete, thus preventing its operation.

Relay PR operates and closes an obvious circuit for operating relay RV, this latter relay straightening out the battery connection to the calling line, since it would have been reversed by the operation of relay AB if relay RV remained normal. This straightening out operation is to keep the grounded tip line (grounded through the coin box polar relay) away from the (—) side of the CCB relay, thus avoiding a lockup condition which would occur if the CCB relay should have its (—) winding connected to the grounded tip line.

When the called party hangs up, relay AB of the connector is released for straightening out the battery feed at this point. It now becomes necessary to reverse the line again at the adapter to prevent the above described lockup condition. This is done by releasing relay PR which in turn releases relay RV, relay PR releasing because the battery flow from relay CCB is now in a direction for rectifier RC to conduct and thus shunt out the winding of relay PR.

When the calling party hangs up the receiver, the line circuit is opened for effecting the release of relays CCB and CRD in the connector. The release of relay CRD disconnects (+) from the sleeve conductor for rendering this connector idle and for opening up the above described circuit for relay SS, which effects the release of this relay. Relay SS opens up and releases relay SD and, since this latter relay is slow to release, a circuit is closed for operating relay CL extending from (+), break contact of relay SS, make contact of relay SD and winding of relay CL to (—). Relay CL closes a first locking circuit for itself which may be traced from (+), make contact of relay SD, make contacts in series of relay SW, make contact and winding of relay CL to (—). The operation of relay CL closes a circuit for operating relay CA which may be traced from 110V (+), make contact of relay SW, make contact of relay CL, lamp LP, winding of relay CA, break contact of relay CI and resistor 3RS to (+). Relay CA closes a circuit for lighting paystation lamp PS as an indication to an attendant in the dial office that the coin control operation is being effected. Relay CA closes a second locking circuit for relay CL extending from (+), make contact of relay CA, make contact and winding of relay CL to (—). The release of relay SD opens up the above described first locking circuit for relay CL.

The operation of relay CL connects pulses from the 60 I. P. M. source to the upper winding of relay CI for intermittently operating this relay. Each time relay CI is operated the 110V (+) is applied to the calling line over the above described circuit through the winding of relay CA and now including a make contact of relay CI, make contacts of relay CL and both sides of the calling line to the substation. Thus, there is provided coin collect battery which is intermittently applied to the calling line until the coin is collected. When the coin is collected the mechanism at the calling station opens up the contact in the circuit to the polar relay. When the coin collect voltage is next applied to the calling line there is no circuit completed at the substation, and, consequently, relay CA is released for extinguishing lamp PS and for opening up the above described locking circuit for relay CL for effecting the release of this relay. It will be noted that the locking circuit for relay CL, including the make contact of relay CA, also extends to the locking circuit of relay SW for keeping this relay operated during the coin collect operations. When relay CA is released and this locking circuit is opened, relay SW is released at the same time that relay CL is released.

The operation of relay CL applies (+) potential to the sleeve conductor leading back to the finder and calling line circuits for holding this connection until the coin control operation has been completed. When this (+) is removed from the sleeve conductor by the release of relay CL, the circuits are all restored to normal condition.

In the event that the call is not answered, relay AB does not operate with the result that relay SW is not operated. Consequently, relays MG and CB are not released and the line is not switched through to the connector in the previously described manner. This leaves the circuit in condition where battery is fed to the calling line from the adapter, with the repeating circuits completed by way of the trunk conductors to the connector circuit, including talking condensers C1 and C2. This prevents the operation of relays PR and RV. Now when the connection is released, relays SS and SD release and relays CL and CA operate as before. The resulting short circuit of the line connects coin control battery back over the calling line circuit. This time, however, 110 v. (—) is applied to the calling line because relay SW is not operated (because the call was not answered), this circuit extending from 110 v. (—), make contact of relay CL, break contact of relay SW, make contact of relay CL, lamp LP, winding of relay CA, make contact of relay CI, make contacts of relay CL and both sides of the calling line in multiple. This effects the refunding operation at the calling station coin box and when the coin is refunded and the circuit including the winding of the polar relay at the station is opened the clearing out operation above described is again effected.

It was previously explained that relay CI is intermittently operated from the 120 I. P. M. source following the operation of relay MG and up to the time that relay MG is released after the call is answered. It will now be explained why this circuit is provided. It is contemplated that the selector used in this system will be of the type which applies pulses to the conductor to which wiper HSS is connected if and when this selector finds all trunks in the selected level busy and goes to overflow. Since the circuit including wiper HSS leads back to the upper winding of relay SW for energizing this relay when the call is answered on a successful call, and since it is possible for 120 I. P. M. pulses to be applied to this same circuit leading to the upper winding of relay SW when the selector goes to overflow, it becomes necessary to guard against the operation of the SW relay of the adapter when this overflow condition is encountered. To accomplish this, relay CI is intermittently operated by the same 120 I. P. M. source of pulses that is connected to the overflow circuit of the selector for operating relay CI by each pulse which would be connected back by way of wiper HSS, the operation of relay CI opening up the circuit to the upper winding of relay SW. Since relay SW is slow to operate, a pulse will operate relay CI and open up the circuit to relay SW before the same pulse can be effective by way of the overflow circuit to operate relay SW. It will be noted that this intermittent operation of relay CI from the 120 I. P. M.

source is effective up to the time the call is answered, after which the circuit is opened. This provides a guarding arrangement to prevent the faulty operation of relay SW before it is required to operate this relay by the answering of the call.

What I claim is:

1. In a telephone system, a first calling line and a second calling line, a finder link controlled by the removal of the receiver at the substation of either of said calling lines for extending a connection thereto, directively controlled switching devices controlled from either of said calling lines by way of said finder link for extending a talking connection to a called line, a discriminating device permanently associated with said finder link, and means controlled by said discriminating device in response to the replacement of the receiver at a calling station for effecting the immediate release of the connection if originated from said first calling line and for delaying the release of the connection if originated from said second calling line whereby coin control current may or may not be applied to said second line before it is released from said link.

2. In a telephone system, calling lines of two different classes, a finder link controlled by the removal of the receiver at the substation of lines of either class for extending a connection thereto, directively controlled switching devices controlled from lines of either class by way of said finder link for extending a talking connection to a called line, a discriminating device permanently associated with said finder link, and means controlled by said discriminating device in response to the replacement of the receiver at a calling station on a line of one class for effecting the immediate release of the connection and for delaying the release of the connection if originated from a station on a line of another class whereby coin control current may or may not be applied to said second line before it is released from said link.

3. In a coin control system for telephone exchanges in which the line at a paystation must be grounded by means of a deposited coin in order to establish an outgoing talking connection, lines of a first class including paystation lines and lines of a second class including free service lines, a link circuit through which calls to called lines are established from lines of either class, a marking circuit associated with said link circuit, and means including said marking circuit for controlling the application of coin control current to a calling line of said first class for disposing of the deposited coin and for removing the ground at the paystation.

4. In a coin control system for telephone exchanges in which the line at a paystation must be grounded by means of a deposited coin in order to establish an outgoing talking connection, lines of a first class including paystation lines and lines of a second class including free service lines, a link circuit through which calls to called lines are established from lines of either class, a marking circuit associated with said link circuit energized or not in accordance with the class of the line to which the finder link is connected, and means including said marking circuit for controlling the application of coin control current to a calling line for disposing of the deposited coin and for removing the ground at the paystation.

5. In a coin control system for telephone exchanges in which the line at a paystation must be grounded by means of a deposited coin in order to establish an outgoing talking connection, lines of a first class including paystation lines and lines of a second class including free service lines, a link circuit through which calls to called lines are established from lines of either class, a marking circuit associated with said link circuit energized or not in accordance with the class of the line to which the finder link is connected, and means including said marking circuit for controlling the intermittent application of coin control current to a calling line for disposing of the deposited coin and for removing the ground at the paystation.

6. In a coin control system for telephone exchanges in which the line at a paystation must be grounded by means of a deposited coin in order to establish an outgoing talking connection, a paystation line and a free service line, a line finder and a line connector used for establishing talking connections to a called line from a calling paystation line or from a calling free service line, a paystation adapter permanently associated with said line finder, a supervisory circuit extending from said line connector to said adapter, means responsive to the answering of a call to said called line for energizing said supervisory circuit, means in said adapter controlled over said supervisory circuit for controlling the application of coin control current to said calling paystation line, and means in said adapter for preventing the application of coin control current to said calling free service line.

7. In a coin control system for telephone exchanges in which the line at a paystation must be grounded by means of a deposited coin in order to establish an outgoing talking connection, a paystation line and a free service line, a line finder and a line connector used for establishing talking connections to a called line from a calling paystation line or from a calling free service line, a paystation adapter permanently associated with said line finder, a supervisory circuit extending from said line connector to said line finder, means responsive to the answering of a call to said called line for energizing said supervisory circuit, means in said adapter controlled over said supervisory circuit for controlling the intermittent application of coin control current to said calling paystation line, means in said adapter for preventing the application of coin control current to said calling free service line, and means responsive to the disposal of said deposited coin for stopping said intermittent application of coin control current to said calling paystation line.

8. In an automatic telephone system; a plurality of lines in one group, certain of the lines being of the paystation type and certain other lines being of the free service type; links comprising automatic switching apparatus including non-numerical and numerical switches for establishing talking circuits from any of said plurality of lines to a called station; a paystation adapter circuit associated with each of said links operative in connection with calls from any of said plurality of lines; a marking circuit associated with each link; and means including the marking circuit of each link controlled in accordance with the use of the link by a paystation line or a free service line for applying or not applying coin control potential to a calling line.

9. In an automatic telephone system, a plurality of lines in one group, certain of the lines being of the paystation type and certain other lines being of the free service type; links comprising automatic switching apparatus including non-numerical and numerical switches for establishing talking circuits from any of said plurality of lines to a called station; a paystation adapter circuit associated with each of said links operative in connection with calls from any of said plurality of lines; a first and a second marking circuit associated with each link; means including the first marking circuit of each link controlled in accordance with the use of the link by a paystation line or a free service line for applying or not applying coin control potential to a called line; and means including the second marking circuit of each link controlled in accordance with whether said called station answers a call or not for selecting coin collect or coin return potential to be applied to a calling line.

FRANK KESSLER.

References Cited in the file of this patent

UNITED STATES PATENTS

| Number | Name | Date |
|---|---|---|
| 1,963,929 | Baker | June 19, 1934 |
| 2,106,360 | Raymond | Jan. 25, 1938 |
| 2,214,213 | Voss | Sept. 10, 1940 |
| 2,226,731 | Lomax | Dec. 31, 1940 |
| 2,336,866 | Hovland | Dec. 14, 1943 |
| 2,367,769 | Goddard | June 23, 1945 |
| 2,374,964 | Walsh | May 15, 1945 |
| 2,385,720 | Molnar | Sept. 25, 1945 |
| 2,471,087 | Anderson | May 24, 1949 |
| 2,558,571 | Lamberty | June 26, 1951 |